April 14, 1964  J. F. HEIN ETAL  3,128,639
CLUTCH AND STARTER ASSEMBLY
Filed Oct. 1, 1959  2 Sheets-Sheet 1

INVENTORS
Joseph F. Hein, &
Robert G. Renius
BY
A. M. Leiter
ATTORNEY

April 14, 1964   J. F. HEIN ETAL   3,128,639
CLUTCH AND STARTER ASSEMBLY
Filed Oct. 1, 1959

INVENTORS
Joseph F. Hein, &
Robert G. Renius
BY
A. M. Leiter
ATTORNEY

United States Patent Office 3,128,639
Patented Apr. 14, 1964

3,128,639
CLUTCH AND STARTER ASSEMBLY
Joseph F. Hein, Flint, and Robert G. Renius, Detroit, Mich., assignors to General Motors Corporation, Detroit, Mich., a corporation of Delaware
Filed Oct. 1, 1959, Ser. No. 843,685
23 Claims. (Cl. 74—572)

This invention relates to a power plant and more particularly to a clutch construction.

In power plants employing air cooled engines it is particularly desirable to provide a large unobstructed air passage to and from the engine for the circulation of the large volume of air required for cooling. In conventional engines the accessories such as the starter are located closely adjacent the engine and would interfere with the circulation of cooling air over the engine. Thus, in a power plant consisting of an air cooled flat engine and a clutch driven by the engine, it is proposed to modify the clutch construction so that the starter ring gear may be fixed mounted at the output edge of the clutch cover plate. The starter motor then can be mounted on the output side of the clutch and closer to the axis of the power plant and clutch in order to provide a unit having a smaller diameter than the conventional units where the starter ring gear is located on the engine flywheel and located on the input side of the clutch assembly.

An object of this invention is to provide in power plant having in combination, an air cooled engine, a clutch and a starter, a clutch and starter assembly with the starter located on the output side of the clutch.

Another object of the invention is to provide in a power plant having a flat air cooled engine, a clutch and a starter, a clutch assembly having the starter ring gear mounted on the sheet metal cover plate of the clutch at the output edge of the cover plate for cooperation with a starter motor located on the output side of the clutch assembly.

Another object of the invention is to provide in a clutch assembly, a ring gear mounted on the free edge of the sheet metal cover plate which is attached to the flywheel for cooperation with a starter assembly located on the output side of a clutch.

These and other objects of the invention will be more apparent from the following description and drawings of the preferred embodiments of the invention.

Figures 1, 2:
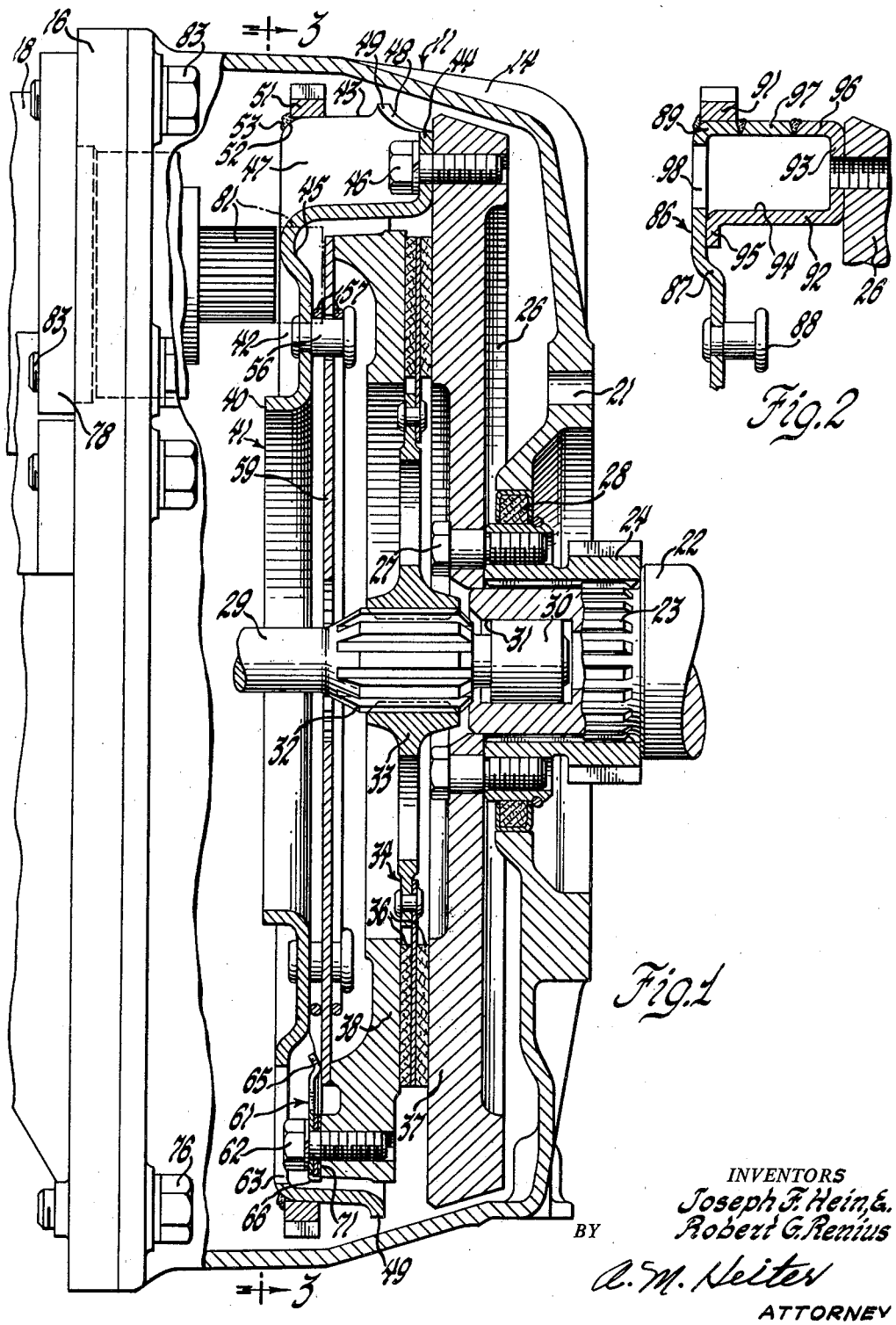
FIGURE 1 is an assembly view of the clutch and the starter with parts broken away and in section to show the details.
FIGURE 2 is a partial sectional view of the clutch showing a modified cover plate.

The invention is illustrated in the power plant assembly having a flat air cooled engine 10, a clutch assembly 11, a differential assembly 12 and a transmission assembly 13. Since cooling air approaches the air cooled flat engine 10 having horizontal opposed banks of cylinders 10' from the top through a generally rectangular conduit 15 as shown in detail in S.N. 843,736, filed by Joseph T. Berstch, now Patent No. 2,972,340 issued Feb. 21, 1961, it is desirable to remove the accessories from the conventional location on top of or closely adjacent the engine which would obstruct the free flow of cooling air over the engine. The operating mechanism of the clutch 11 is located within a bell housing 14 which is secured to the rear wall of the engine housing 10 as shown in S.N. 840,590, filed by Adelbert E. Kolbe, now Patent No. 2,974,660 issued March 14, 1961. The output side of the bell housing 14 is closed by a mounting plate 16 which supports the differential assembly 12 and provides one wall of the differential housing 17 and in addition supports the starter 18. The transmission housing 19 is secured to the other side of the differential assembly 12, as shown in detail in the application S.N. 843,681, filed by George Popovich, now Patent No. 3,101,010 issued August 20, 1963.

The clutch assembly 11 as shown in detail in FIGURE 1 has a bell housing 14 secured by bolts passing through apertures 21 to the rear wall of the engine housing. The engine shaft 22 is connected by suitable splines 23 to the clutch input sleeve shaft 24. The flywheel 26 is secured by bolts 27 to the sleeve shaft 24 to rotate with the engine shaft 22. The oil seal 28 prevents the leakage of oil from the engine housing to the clutch housing 14.

The clutch output shaft 29 has a bearing portion 30 at the input end rotatably supported in the bore 31 in the shaft 24 and is connected by a suitable spline 32 to the hub 33 of the clutch driven plate 34. The clutch driven plate 34 has friction surfaces 36 located between the fixed pressure plate portion 37 of the flywheel 26 and the movable pressure plate or backing plate 38. The sheet metal cover plate 41 has a generally annular shape and includes a radial portion 42 reinforced by an axial internal flange 40 and an external bead or flange 45, and integral interrupted cylindrical peripheral portion 43. The peripheral portion 43 is indented, preferably at six points, around the perimeter to provide recesses 47 and radially located pad portions 44 contacting the adjacent surface of the flywheel 26 which are apertured to receive the bolts 46 securing the cover 41 to the flywheel 26. At each of the pad portions 44 the recessed portion 47 in the cylindrical peripheral portion 43 provides a space or recess portion in the peripheral wall 43 of the cover plate 41 permitting access to the bolts 46. While the pad portions 44 contact the flywheel the lower peripheral edge of the cylindrical portion 43 curves upwardly at 48 on each side of the pads 44 so that the cylindrical portion 43 between each of the pads 44 is spaced from the flywheel 26 to provide air circulation passages. The peripheral wall portion 43 consisting of the segmental cylindrical portions between recesses 47 of the stamped cover plate has a radial reinforcing flange 49 and is ground to provide an accurate cylindrical portion to receive the starter ring gear 51 and is rounded at the corner 52 to aid in stamping this member and to provide a ready made V for the weld 53 which secures the starter ring gear to the cover 41.

Figure 3:
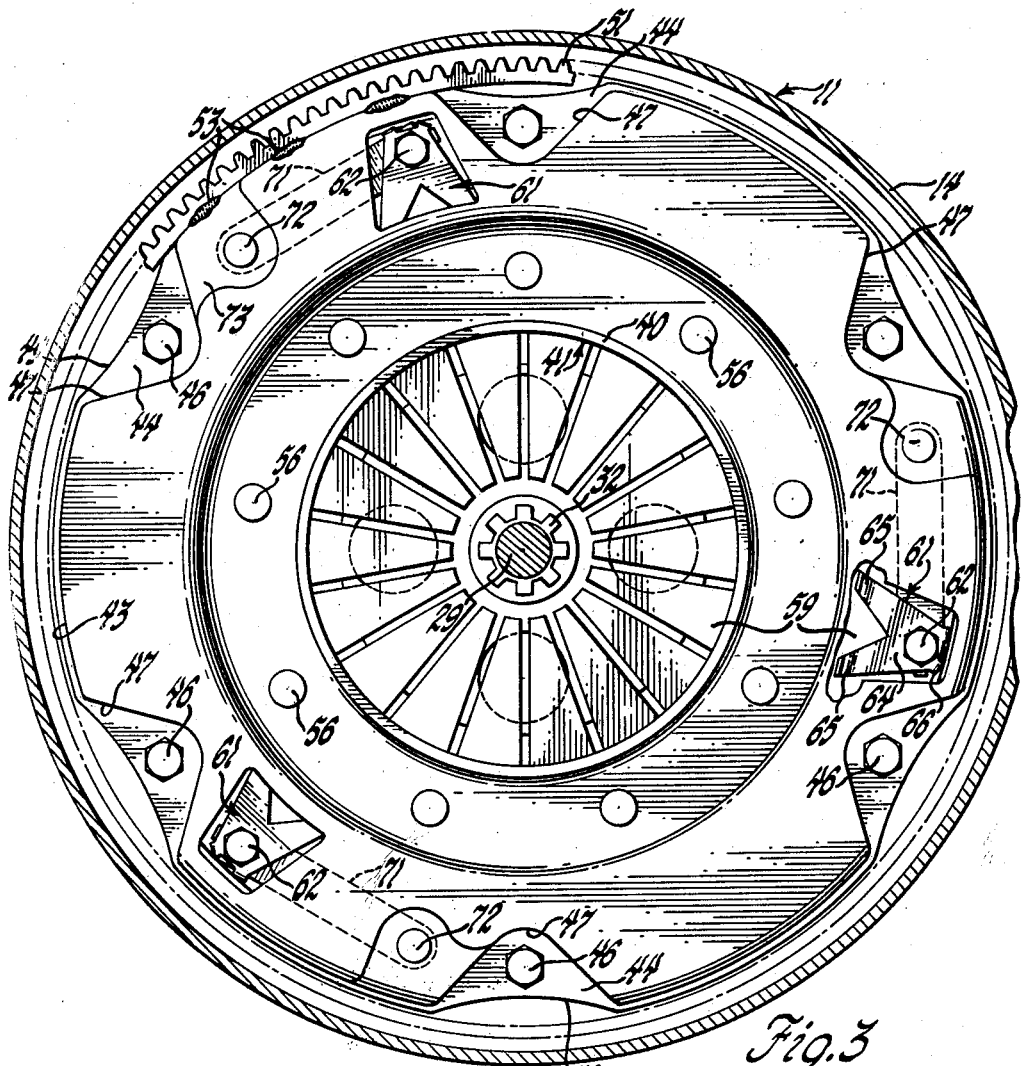
FIGURE 3 is a sectional view of FIGURE 1 on line 3—3 showing the clutch cover plate.

The radial portion 42 of the cover plate supports the anchor pins 56 on which the wire fulcrum rings 57 are mounted to pivotally support the Belleville spring 59 which applies and release the clutch in the conventional manner. The Belleville spring 59 is pivotally secured to the pressure plate 38 by three spring clamps 61 secured to the pressure plate by bolts 62 inserted through access holes 63. As best shown in FIGURE 3 each spring clamp has a central body portion 64 apertured to receive the bolt 62 and a pair of spring fingers 65 each having an undulated end pivot portion (FIG. 1) engaging the Belleville spring 59. The pivot portions of all the fingers engage the Belleville spring about a circle to pivotally hold it in contact with the pressure plate 38. The spring clamp 61 at the other side of the body portion 4 has two spaced downwardly extending tongues 66 engaging the outer edge of the strap 71 to prevent rotation and to hold the spring clamp 61 in the position shown. The pressure plate 38 is connected to the cover 41 and flywheel 26 assembly for rotation as a unit by three spring straps 71 which are secured at one end to the pressure plate 38 by bolt 62, and extend tangentially with respect to the perimeter of the pressure plate, and are secured at their other end by a fastening device 72 located in a depressed portion 73 of the cover plate 41. Straps 71 are thus substantially parallel to the adjacent face of the pressure plate 38.

Figure 4:
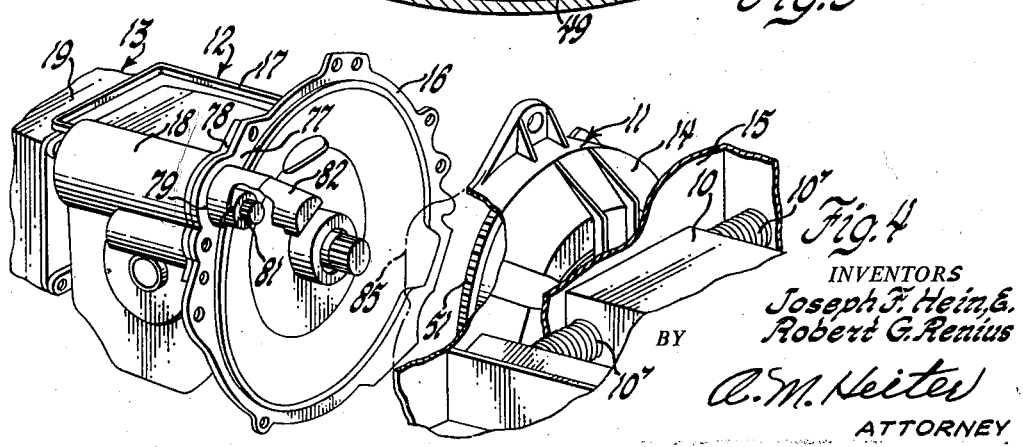
FIGURE 4 is a perspective expanded view showing the power plant assembly.

The cover plate 16 is secured by suitable bolts 76 to the bell housing 14 to form the housing for the clutch 11. In one of the four quarters between the horizontal and vertical axes, the plate 16, FIG. 4, has an extension 77 providing a pad to receive the attaching flange 78 of the starter assembly 18 without increasing the width or height of the assembly. The flange 77 also has an aperture 79 through which the starter gear 81 and the starter gear shield 82 pass. Bolts 83 secure starter flange 78 to plate 16. The bell housing has a bulge 85 to provide a space for the insertion of the starter gear 81 and shield 82 which fits the outer perimeter of the plate 77. On energization of starter 18 in the conventional manner starter gear 81 moves forward and engages the starter ring gear 51. This arrangement permits the input end of the bell housing 14 to have a reduced diameter and enables the starter motor 18 to be located at the output side of the clutch housing 11.

A modified form of clutch cover plate 86 is illustrated in FIG. 2. This cover plate has a radial portion 87 having a fulcrum pin 88 supporting the Belleville spring in the same manner as illustrated in FIG. 1. The plate 87 has an outer peripheral flange 89 having a complete cylindrical surface on which the starter ring gear 91 is mounted and secured by welds. The plate 87 is supported on the flywheel by three or more supports 92 having a suitable pad portion 93 adapted to engage the flywheel 26 and to be secured by a bolt 46, as shown in FIG. 1, inserted through access hole 98. These supports have an inner cylindrical portion 94 having a flange 95 spot welded to the radial portion 87 and an outer cylindrical stiffening flange 96. A strut 97 or an integral extension of flange 96 may be employed to provide a support for the flange 89 at three or more points about the perimeter of the flange 89.

The above described preferred embodiments are illustrative of the invention, and it will be apparent that modifications may be made within the scope of the appended claims.

We claim:

1. In a clutch, a flywheel having a backing plate surface on the output side opposite the input side, an annular sheet metal cover member having a radial portion and a peripheral portion secured to the output side of said flywheel, said peripheral portion having a cylindrical surface portion at least as large in diameter as said flywheel adjacent the output edge, said cover member having support means extending from a point substantially within said cylindrical surface axially beyond said cylindrical surface portion and having a pad portion extending radially outwardly and engaging the surface of the output side of said flywheel within said cylindrical surface, means securing said pad portion to said flywheel, and a starter ring gear secured to said cylindrical portion adjacent the output edge of said cover member.

2. In a clutch, a flywheel having a backing plate surface on the output side opposite the input side, an annular sheet metal cover member having a radial portion at the output edge and a peripheral portion extending to the input edge and secured to the output side of said flywheel, said peripheral portion having an interrupted cylindrical surface portion at the output edge, a plurality of recessed portions formed in said peripheral portion indented radially inwardly and extending axially beyond said cylindrical surface portion and having a radial flange portion engaging the surface of the output side of said flywheel, means securing said flange portion to said flywheel and a starter ring gear secured to said cylindircal portion at the output edge of said cover member.

3. The invention defined in claim 2 and said cylindrical surface portion having a diameter at least as large as said flywheel and said flange portion being located entirely within said cylindrical surface portion.

4. In a clutch, a flywheel having a backing plate surface on the output side opposite the input side, an annular sheet metal cover member having a radial portion and a peripheral portion secured to the output side of said flywheel, said peripheral portion having an uninterrupted cylindrical surface portion adjacent the output edge, a plurality of sheet metal support portions secured to said radial portion substantially within said peripheral portion and extending axially beyond said cylindrical portion and having a pad portion engaging the surface of the output side of said flywheel, securing means securing said pad portion to said flywheel, access apertures in said radial portion between said peripheral portion and said support portions for access to said securing means, and a starter ring gear secured to said cylindrical portion adjacent the output edge of said cover member.

5. The invention defined in claim 4 and said cylindrical portion being very narrow, and said support portions having a limited peripheral length to provide large air passages extending radially from the center of the clutch between the flywheel and cover member.

6. In a clutch, a flywheel having a backing plate surface on the output side opposite the input side, an annular sheet metal cover member having a radial portion and a peripheral portion, said peripheral portion having an interrupted cylindrical surface portion adjacent the output edge, a plurality of recessed portions formed in said peripheral portion indented radially inwardly and extending axially beyond said cylindrical surface portion and having a radial flange portion engaging the surface on the output side of said flywheel, means securing said flange portion to said flywheel, and a starter ring gear secured to said cylindrical portion adjacent the output edge of said cover member.

7. The invention defined in claim 6 and said cylindrical surface portion having a beveled output edge to provide a V groove to receive the welding material.

8. In a clutch, a flywheel having a backing plate surface on the output side opposite the input side, an annular stamped sheet metal cover member having a radial portion at the output edge and a peripheral portion extending to the input edge and secured to the output side of said flywheel, said peripheral portion having an interrupted cylindrical surface portion at the output edge having a diameter at least as large as the diameter of said flywheel, a plurality of recessed portions formed in said peripheral portion indented radially inwardly and extending axially beyond said cylindrical surface portion and having a radial flange portion located radially within said cylindrical portion engaging the surface of said flywheel closely adjacent the external perimeter of said backing surface, means securing said flange portion to said flywheel, and a starter ring gear secured to said cylindrical portion at the output edge of said cover member.

9. The invention defined in claim 8 and said cylindrical surface being ground on said stamped sheet metal cover.

10. The invention defined in claim 8 and a housing closely surrounding said clutch and having a smaller diaeter at the input end than at the output end.

11. In a power plant assembly, the combination of an air cooled engine having an engine shaft, a vertically extending air passage surrounding said engine, a clutch bell housing secured to the rear wall of said engine, a flywheel mounted on said engine shaft having an input side adjacent said engine and an output side and located in said clutch bell housing, a generally annular sheet metal cover plate having a radial portion, a circumferential portion, and a plurality of axially extending support pads, said pads being secured to said output side of said flywheel, a pressure plate supported on said cover plate for rotation with said cover plate and for axial movement, a clutch output shaft, a clutch driven plate located between said pressure plate and flywheel rotatably connected to said clutch driven shaft, clutch apply means supported on said radial portion of said cover plate, a starter ring gear, said clutch cover plate circumferential portion having an outer cylindrical surface adjacent the output side of said cover plate, said starter ring gear being secured to said cylindrical surface, a closure plate secured to and closing the open end of said clutch bell housing, said closure plate having an aperture, a starter secured externally to said closure plate adjacent said aperture, and said starter having a starter gear projecting through said aperture for engagement with said starter ring gear.

12. In a power plant assembly, the combination of a flat horizontal air cooled engine having pistons extending horizontally from each side of the engine and an engine shaft, a vertically extending air passage surrounding said engine, a clutch bell housing secured to the rear wall of said engine, a flywheel mounted on said engine shaft having an input side adjacent said engine and an output side and located in said clutch bell housing, a generally annular sheet metal cover plate having a radial portion, a circumferential portion, and a plurality of axially extending support pads, said pads being secured to said output side of said flywheel, a pressure plate supported on said cover plate for rotation with said cover plate and axial movement, a clutch output shaft, a clutch driven plate located between said pressure plate and flywheel rotatably connected to said clutch driven shaft, clutch apply means supported on said radial portion of said cover plate, a starter ring gear, said clutch cover plate circumferential portion having an outer cylindrical surface adjacent the output side of said cover plate, said starter ring gear being secured to said cylindrical surface, a closure plate secured to and closing the open end of said clutch bell housing, said closure plate having an aperture, a starter located on the output side of said clutch closure plate and secured to the outside surface of said closure plate adjacent said aperture, and said starter having a starter gear projecting through said aperture for engagement with said starter ring gear.

13. In a power plant assembly, the combination of an air cooled engine having an engine shaft, a vertically extending air passage surrounding said engine, a clutch bell housing secured to the rear wall of said engine, a flywheel mounted on said engine shaft having an input side adjacent said engine and an output side and located in said clutch bell housing, a generally annular one piece sheet metal cover plate having a radial portion, an interrupted cylindrical circumferential portion, and a plurality of axially extending recesses interrupting the cylindrical portion terminating in support pads, said support pads being secured to said output side of said flywheel, a pressure plate nonrotatably and axially movably supported on said cover plate, a clutch output shaft, a clutch driven plate located between said pressure plate and flywheel rotatably connected to said clutch driven shaft, clutch apply means supported on said radial portion of said cover plate, a starter ring gear, said clutch cover plate circumferential portion having an outer interrupted cylindrical surface adjacent the output side of said cover plate, said starter ring gear being secured to said cylindrical surface, a closure plate secured to and closing the open end of said clutch bell housing, said closure plate having an aperture, a starter secured externally to the output side of said closure plate adjacent said aperture, and said starter having a starter gear projecting through said aperture for engagement with said starter ring gear.

14. In a power plant assembly, the combination of an air cooled engine having an engine shaft, a vertically extending air passage surrounding said engine, a clutch bell housing secured to the rear wall of said engine, a flywheel mounted on said engine shaft having an input side adjacent said engine and an output side and located in said clutch bell housing, a generally annular sheet metal cover plate consisting of an annular member having a radial portion, a circumferential portion, and a plurality of separate axially extending support pads secured to said annular member, said pads being secured to said output side of said flywheel, a pressure plate supported on said cover plate for rotation with said cover plate, a clutch output shaft, a clutch driven plate located between said pressure plate and flywheel rotatably connected to said clutch driven shaft, clutch apply means supported on said radial portion of said cover plate, a starter ring gear, said clutch cover plate circumferential portion having an outer cylindrical surface adjacent the ouput side of said cover plate, said starter ring gear being secured to said cylindrical surface, a closure plate secured to and closing the open end of said clutch bell housing, said closure plate having an aperture, a starter secured externally to said closure plate adjacent said aperture, and said starter having a starter gear projecting through said aperture for engagement with said starter ring gear.

15. In a drive assembly, the combination of a drive housing having an output shaft rotatably mounted in said housing, said housing having a transversely extending rear wall, a clutch bell housing secured to said rear wall and being located within the perimeter of said rear wall, a flywheel mounted on said output shaft having an input side adjacent said rear wall and an ouput side and located in said clutch bell housing, a generally annular sheet metal cover plate having a radial portion, a circumferential portion, and a plurality of axially extending support pads, said pads being secured to said output side of said flywheel, a pressure plate supported on said cover plate for rotation with said cover plate and for axial movement, a clutch output shaft, a clutch driven plate located between said pressure plate and flywheel rotatably connected to said clutch driven shaft, clutch apply means supported on said radial portion of said cover plate, a starter ring gear, said clutch cover plate circumferential portion having an outer cylindrical surface adjacent the output side of said cover plate, said starter ring gear being secured to said cylindrical surface, a closure plate secured to and closing the open end of said clutch bell housing, said closure plate having an aperture, a starter secured externally to said closure plate adjacent said aperture, and said starter having a starter gear projecting through said aperture for engagement with said starter ring gear.

16. In a drive assembly, the combination of a drive housing having an output shaft rotatably mounted in said housing, said housing having a transversely extending rear wall, a clutch bell housing secured to said rear wall and being located within the perimeter of said rear wall, a flywheel mounted on said output shaft having an input side adjacent said rear wall and an output side and located in said clutch bell housing, a generally annular sheet metal cover plate having a radial portion, a circumferential portion, and a plurality of axially extending support pads, said pads being secured to said output side of said flywheel, a pressure plate supported on said cover plate for rotation with said cover plate and axial movement, a clutch output shaft, a clutch driven plate located between said pressure plate and flywheel rotatably connected to said clutch driven shaft, clutch apply means supported on said radial portion of said cover plate, a starter ring gear, said clutch cover plate circumferential portion having an outer cylindrical surface adjacent the output side of said cover plate, said starter ring gear being secured to said cylindrical surface, a closure plate secured to and closing the open end of said clutch bell housing, said closure plate having an aperture, a starter located on the output side of said clutch closure plate and secured to the outside surface of said closure plate adjacent said aperture, and said starter having a starter gear projecting through said aperture for engagement with said starter ring gear.

17. In a drive assembly, the combination of a drive housing having an output shaft rotatably mounted in said housing, said housing having a transversely extending rear wall, a clutch bell housing secured to said rear wall and being located within the perimeter of said rear wall, a flywheel mounted on said output shaft having an input side adjacent said rear wall and an output side and located in said clutch bell housing, a generally annular one piece sheet metal cover plate having a radial portion, an interrupted cylindrical circumferential portion, and a plurality of axially extending recesses interrupting the cylindrical portion terminating in support pads, said support pads being secured to said output side of said flywheel, a pressure plate supported for rotation with and axial movement on said cover plate, a clutch output shaft, a clutch driven plate located between said pressure plate and flywheel rotatably connected to said clutch driven shaft, clutch apply means supported on said radial portion of said cover plate, a starter ring gear, said clutch cover plate circumferential portion having an outer interrupted cylindrical surface adjacent the output side of said cover plate, said starter ring gear being secured to said cylindrical surface, a closure plate secured to and closing the open end of said clutch bell housing, said closure plate having an aperture, a starter secured externally to the output side of said closure plate adjacent said aperture, and said starter having a starter gear projecting through said aperture for engagement with said starter ring gear.

18. The invention defined in claim 17 and a housing surrounding said clutch assembly having a closure plate, a starter including a motor and a starter gear, said starter being mounted on said housing with said motor mounted on the external surface of said housing on the closure plate side and said starter gear located inside said housing and engageable with said starter ring gear.

19. In a drive assembly, the combination of a drive housing having an output shaft rotatably mounted in said housing, said housing having a transversely extending rear wall, a clutch bell housing secured to said rear wall and being located within the perimeter of said rear wall, a flywheel mounted on said output shaft having an input side adjacent said rear wall and an output side and located in said clutch bell housing, a generally annular sheet metal cover plate consisting of an annular member having a radial portion, a circumferential portion, and a plurality of separate axially extending support pads secured to said annular member, said pads being secured to said output side of said flywheel, a pressure plate supported on said cover plate for rotation with said cover plate, a clutch output shaft, a clutch driven plate located between said pressure plate and flywheel rotatably connected to said clutch driven shaft, clutch apply means supported on said radial portion of said cover plate, a starter ring gear, said clutch cover plate circumferential portion having an outer cylindrical surface adjacent the output side of said cover plate, said starter ring gear being secured to said cylindrical surface, a closure plate secured to and closing the open end of said clutch bell housing, said closure plate having an aperture, a starter secured externally to said closure plate adjacent said aperture, and said starter having a starter gear projecting through said aperture for engagement with said starter ring gear.

20. In a clutch, a flywheel having a backing plate surface on the output side opposite the input side, a cover plate member having a cylindrical portion at least as large in diameter as said flywheel adjacent the output edge of said cover plate, support means located within said cylindrical portion connected to said cover member and extending axially and connected to said flywheel, a starter ring gear mounted on said cylindrical portion and extending radially beyond said cover member and said flywheel, a bell shaped housing having a generally radial portion at the input end located on the input side of said flywheel gradually curving into an outwardly fairing portion enclosing the flywheel, cover member and ring gear with the largest diameter portion over said ring gear at the output end of said housing.

21. In a clutch assembly, a rigid driving member providing backing plate means, pressure plate means for cooperation with said backing plate means, a sheet metal cover member having less rigidity than said driving member secured to said driving member, said cover member having a support portion axially spaced from said backing plate means of said driving member and a mounting portion axially spaced from said backing plate means of said driving member, and means to movably mount said pressure plate means on said support portion for movement to and from said backing plate means, and a starter ring gear secured to said mounting portion of said cover member.

22. The invention defined in claim 21 and a housing surrounding said clutch assembly having a closure plate on the cover member side of said cover member and driving member, a starter including a motor and a starter gear, said starter being mounted on said housing with said motor mounted on the external surface of said housing on the closure plate side and said starter gear located inside said housing and engageable with said starter ring gear.

23. The invention defined in claim 21, said mounting portion having a portion secured to said driving member and cylindrical portions in contact with the internal surface of said ring gear to support said ring gear.

References Cited in the file of this patent

UNITED STATES PATENTS

| | | |
|---|---|---|
| 2,018,834 | Church | Oct. 29, 1935 |
| 2,111,847 | Eason | Mar. 22, 1938 |
| 2,288,173 | Wohanka | June 30, 1942 |
| 2,433,916 | May et al. | Jan. 6, 1948 |
| 2,641,346 | Risk et al. | June 9, 1953 |
| 2,770,971 | Doane | Nov. 20, 1956 |
| 2,791,913 | Slack | May 14, 1957 |
| 2,974,660 | Kolbe | Mar. 14, 1961 |